US011900748B2

(12) United States Patent
Adur et al.

(10) Patent No.: US 11,900,748 B2
(45) Date of Patent: Feb. 13, 2024

(54) SYSTEM FOR ANALYZING AND ATTESTING PHYSICAL ACCESS

(71) Applicant: VMware LLC, Palo Alto, CA (US)

(72) Inventors: Anoop Adur, Karnataka (IN); Hemant Sahani, Palo Alto, CA (US); Saurav Choudhuri, Karnataka (IN); Aditya Ulman, Karnataka (IN); Ashka Vakil, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 31 days.

(21) Appl. No.: 17/146,893

(22) Filed: Jan. 12, 2021

(65) Prior Publication Data

US 2022/0222995 A1    Jul. 14, 2022

(51) Int. Cl.
*G07C 9/28* (2020.01)
*G06F 9/54* (2006.01)
*G06Q 10/10* (2023.01)

(52) U.S. Cl.
CPC ............. *G07C 9/28* (2020.01); *G06F 9/542* (2013.01); *G06Q 10/10* (2013.01)

(58) Field of Classification Search
CPC ....... G07C 9/28; G07C 2209/14; G06F 9/542; G06Q 10/10; H04W 12/06; H04W 12/08
See application file for complete search history.

(56) References Cited

U.S. PATENT DOCUMENTS

| | | | |
|---|---|---|---|
| 8,739,264 B1 | 5/2014 | Eddings | |
| 10,701,067 B1 | 6/2020 | Ziraknejad | |
| 2016/0014118 A1* | 1/2016 | Da | H04L 63/10 726/4 |
| 2016/0093127 A1* | 3/2016 | Evans | G07C 9/27 340/5.61 |
| 2019/0088059 A1* | 3/2019 | Santhosh | H04L 67/125 |
| 2020/0357209 A1* | 11/2020 | Kochi | G07C 9/10 |
| 2021/0385659 A1 | 12/2021 | Gibbs | |
| 2022/0068070 A1* | 3/2022 | Ouellette | G07C 9/30 |

* cited by examiner

*Primary Examiner* — Vernal U Brown
(74) *Attorney, Agent, or Firm* — King Intellectual Asset Management (57) ABSTRACT

Methods and systems are described for analyzing and attesting physical access to a location. In an example, an administrator can create a survey for users in an organization. The survey can be sent to a user device as a notification. The user can complete the survey, and the user's physical access rights can be determined based on the survey answers. When the user attempts to gain access to a location of the organization, the user can provide a digital access badge. The digital access badge can be mapped to the user's access permissions. The user can be granted or denied access depending on whether the user answered the survey and, if answered, what answers the user provided.

17 Claims, 8 Drawing Sheets

DETERMINE THE CONTENT TO INCLUDE IN THIS NOTIFICATION

CONTENT
TITLE ─── 402
DESCRIPTION ─── 404

CHARACTER LIMIT IS 140

EXAMPLE
⊙ RETURN TO WORK SURVEY
DESCRIPTION GOES HERE AND CAN RUN MULTIPLE TIMES
LOCATION   PALO ALTO ⌄
SURVEY GOES HERE AND MAY LOOK LIKE THIS:
1. CONDITION ONE
2. CONDITION TWO
DO ANY OF THESE APPLY TO YOU?
[ YES ]   [ NO ]

── 401

THIS PREVIEW IS FOR REFERENCE ONLY AND DOES NOT REFLECT INFORMATION ENTERED IN FORM.

LOCATIONS
ENTER THE LOCATIONS YOUR EMPLOYEES CAN CHOOSE FROM, AS WELL AS THE TIMEZONE AND HOW LONG THE SURVEY RESULTS ARE VALID FOR.
── 406                          ── 408                               ── 410

| LOCATION | TIMEZONE | VALIDITY PERIOD |
|---|---|---|
| LOCATION NAME ⌄ | GMT-0:00 UTC - UNIVERSAL TIME ⌄ | ONE DAY ⌄ |

ADD LOCATION
SURVEY ─── 412
ENTER THE SURVEY CONTENT BELOW. SURVEY MUST BE ANSWERABLE AS A YES OR NO QUESTION. ANSWERING YES WILL REVOKE DIGITAL BADGE ACCESS THROUGH PASSPORT IN INTELLIGENT HUB.

CHARACTER LIMIT IS 140

CANCEL [BACK] [NEXT]

*FIG. 4A*

CUSTOM NOTIFICATION
1. DEFINITION
2. CONTENT
3. SCHEDULING
4. SUMMARY

420

DEFINE THE EXPIRATION DATE FOR THIS NOTIFICATION. THE NOTIFICATION WILL AUTOMATICALLY DISMISS AT THAT TIME.

EXPIRATION DATE   MM/DD/YYYY 📅   422 12:00   426 AM ⌄   428

FEB 2018   < 📅 >
S  M  T  W  T  F  S
28 29 30 31 1  2  3
4  5  6  7  8  9  10
11 12 [13] 14 15 16 17
18 19 20 21 22 23 24
25 26 27 28 1  2  3
4  5  6  7  8  9  10

424

GMT-0:00 UTC - UNIVERSAL TIME ⌄
10:00 PM YOUR LOCAL TIME.

CANCEL  BACK   NEXT

SYSTEM FOR ANALYZING AND ATTESTING PHYSICAL ACCESS

BACKGROUND

The COVID-19 outbreak wreaked havoc on the traditional workplace environment. Entering a workplace could suddenly be deadly for an employee, especially if another employee entered the workplace who had contracted COVID-19. Companies scrambled to provide, where possible, means for employees to work from home while figuring out how to make workplaces safe for employees to return.

Some organizations have relied on manual processes, such as setting up a station at entry points to check each employee that enters. However, this solution requires making a few employees be physically near everyone who attempts to access the location, which can put those employees at risk. It also requires significant extra cost and can cause long delays for employees trying to enter the workplace. Also, current access control methods require employees and others to physically touch items or devices when attempting to enter. For example, employees can be required to attest in writing that they have not experienced COVID-19 symptoms, but that requires the touching of pens and the signed paper by multiple individuals, which can further spread the virus. Such a process can also raise privacy issues when one employee is forced to divulge medical information to another.

In addition, COVID-19 is just an example of a larger problem—companies do not have adequate systems for restricting physical access based on a dynamic risk assessment of the individual. Employees are typically allowed or denied access without regard to individual risks based on compromised devices, health, or any other risk factor.

As a result, a need exists for providing contact-free means for attesting and determining physical access permissions to a location.

SUMMARY

Examples described herein include systems and methods for analyzing and attesting physical access to a location. In an example, an administrator ("admin") console can include a graphical user interface ("GUI") that allows an admin user to create a survey for users in an organization. In one example, the survey can be presented on user devices as a notification. The admin console can send the survey to a server. In one example, the server can include a notification service that manages notifications for the organization. The server can send the notification to user devices according to instructions from the admin console.

In an example, a user device for a user can receive the survey and display a notification prompting the user to complete the survey. In one example, the survey and notification can be handled by a management application on the user device. The user can interact with the notification and complete the survey. The user device can send the user's survey answers to a passport service. The passport service can be responsible for managing physical access rights for users in the organization. In an example, the passport service can also be on a server, but it does not need to be the same server as the notification service. The passport service can determine whether the user should be allowed physical access to a location based on the completed survey. In one example, the passport service can cause a notification to be sent to the user device indicating whether the user can access the location based on the survey response.

In an example, the passport service can send the physical access permissions for the user to a physical access control system ("PACS"). The PACS can be system that manages entry and exit to a location, such as a property, building, or room. The PACS can store physical access permissions for users in the organization. When the user attempts to enter a location of the organization, a human interface device ("HID") at the location can receive credentials from the user, such as a digital access badge. In one example, the HID can communicate with the user device to retrieve the credentials. The HID can query the PACS for the access permissions of the user. The HID can grant or deny access to the user based on the response from the PACS.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Methods and systems are described for analyzing and attesting physical access to a location. In an example, an administrator can create a survey for users in an organization. The survey can be sent to user devices as a notification. When a user completes a survey, the user's device can send the survey answers to a server. The server can analyze the survey answers to determine whether to enable or disable physical access for the user. The server can send the physical access permissions to a PACS. When the user attempts to access a location, the user can provide a digital access badge to an HID at the location. The HID can use the digital access badge to query the PACS for the user's physical access permissions. The HID can grant or deny access based on the physical access permissions provided by the PACS.

Figure 1:
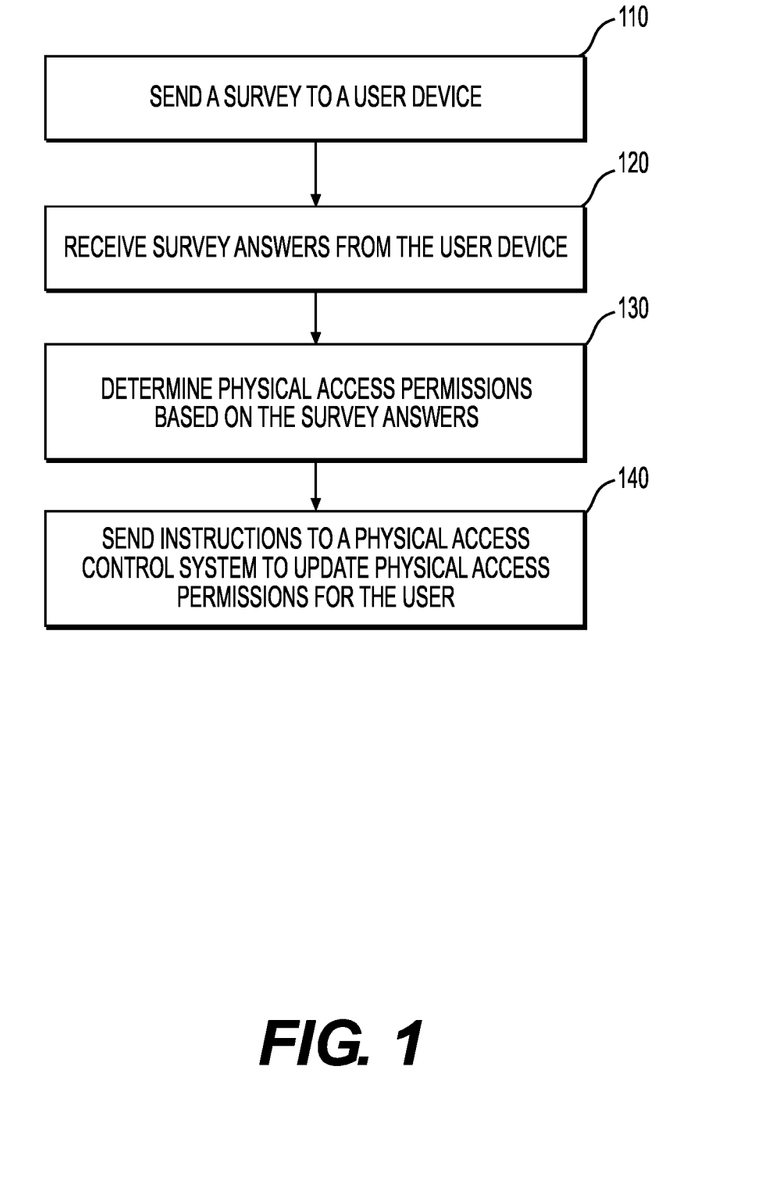
FIG. 1 is a flowchart of an example method for analyzing and attesting physical access.
Figure 2:
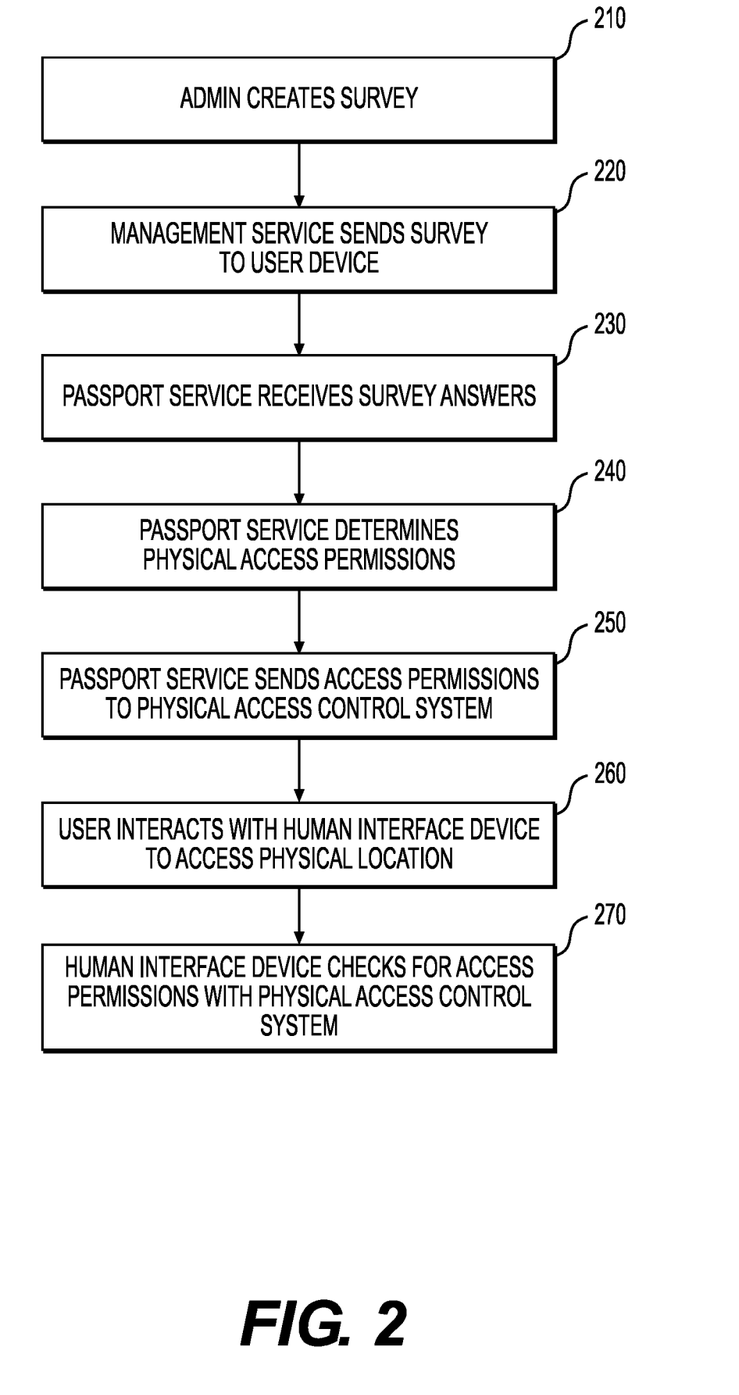
FIG. 2 is another flowchart of an example method for analyzing and attesting physical access.
Figure 3:
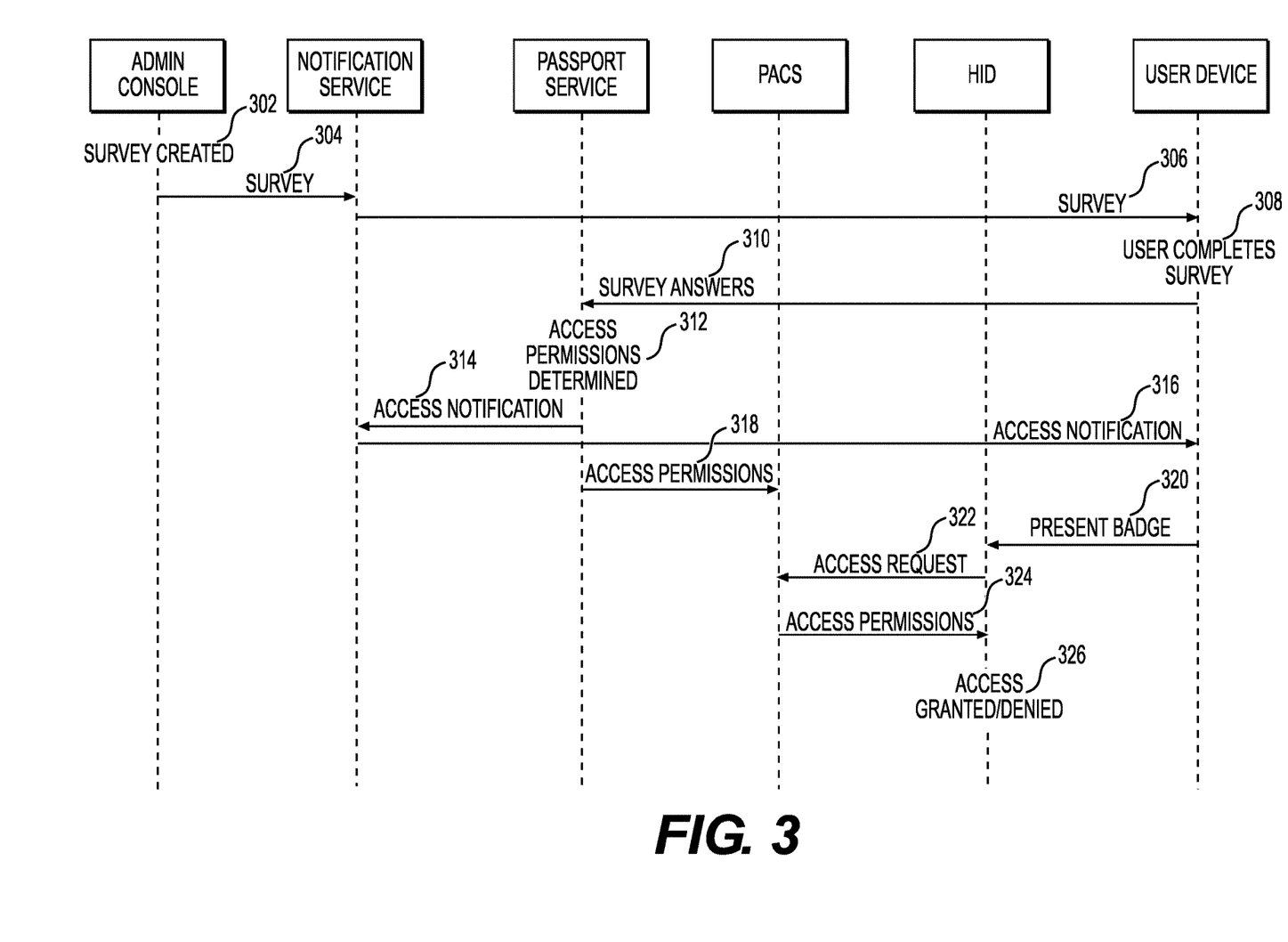
FIG. 3 is a sequence diagram of an example method for analyzing and attesting physical access.
Figure 4A:
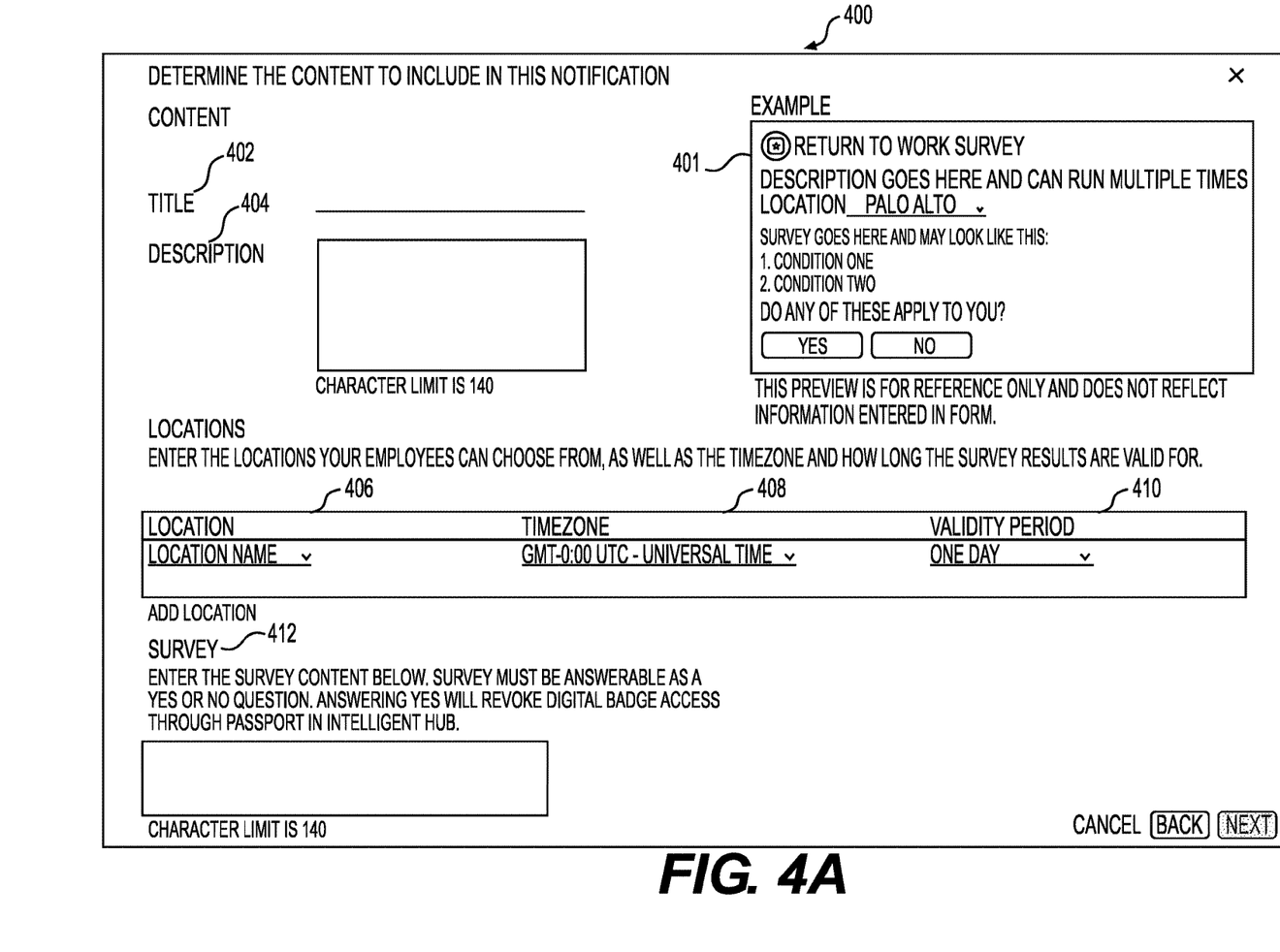
FIGS. 4A and 4B are illustrations of an example graphical user interface ("GUI") of a console used to perform various methods described herein.
Figure 4B:
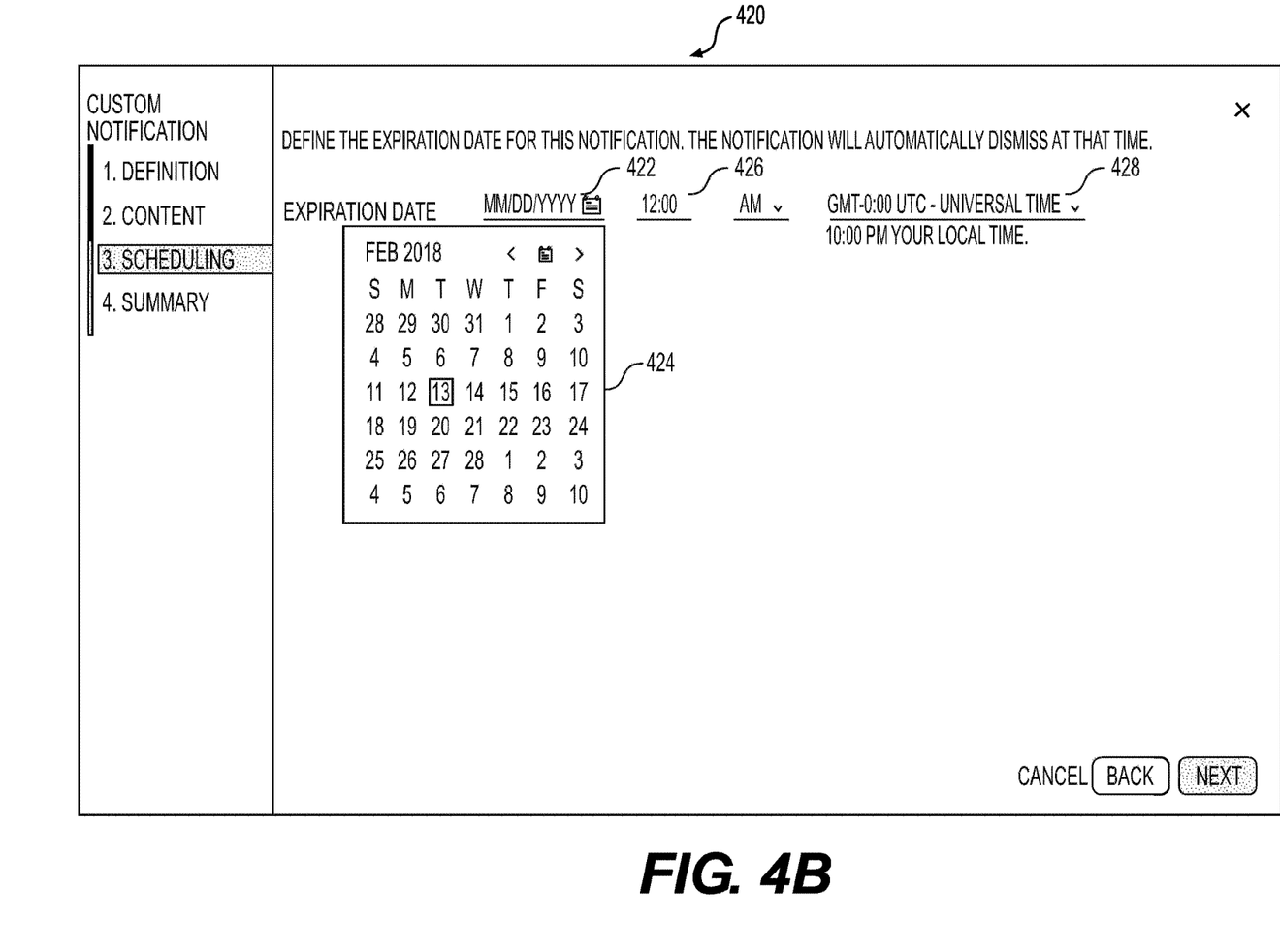

FIGS. 1 and 2 are flowchart of examples for analyzing and attesting physical access. FIG. 3 is a sequence diagram of an example method for analyzing and attesting physical access that includes an admin console, a notification service, a passport service, a PACS, an HID, and a user device. FIGS. 4A and 4B are illustrations of an example GUI that an admin can use to create a survey notification. FIGS. 5A, 5B, 5C, and 5D are illustrations of an example GUI for a survey notification that can be displayed on a user device. FIG. 6 is an illustration of an example system for analyzing and attesting physical access.

FIG. 1 is a flowchart of an example method for analyzing and attesting physical access. At stage 110, a server can send a survey to a user device. The server can be a single server or a group of servers, including multiple servers implemented virtually across multiple computing platforms. In one example, the server can be part of a unified endpoint management ("UEM") system. A UEM system can be a system that manages and secures user devices that are enrolled with an enterprise.

In an example, the survey can be received from an admin console. An admin console can be an interface that allows an admin to manage user accounts and configuration settings for an organization, such as a UEM system. The interface can be accessible using an admin account. For example, an admin can log into a computing device and create a survey using an application interface. When the admin finishes creating the survey, the admin console can send the survey to the server.

In one example, the survey can be part of an interactive notification, and the server that receives the survey can include a notification service. An interactive notification can be a notification for a user device that allows user interaction. For example, an interactive notification can allow a user to select a button or input text. A notification service can be a service that manages notifications for user devices. For example, the notification service can receive requests to send notifications, determine which user devices should receive a notification, send notifications to user devices, and track when and how users interact with notifications on their user devices.

In one example, the survey can include questions that can be used to determine whether a user can have permission to access a physical location. For example, the survey can be used to determine whether a user can enter an office or a secure room of an enterprise. Using COVID-19 as an example, the survey can ask users questions about whether they are experiencing any symptoms of COVID-19 or whether they were exposed to someone they knew had COVID-19. If the user answers yes to any of the questions, the user can be denied physical access to any physical locations of the enterprise. The questionnaire can screen for different health conditions, such as fevers or the flu, and in some examples may not even focus on health questions. Any questions that are relevant to whether a person should have access to a building can be included in a survey.

In an example, the survey sent to the user device can be based on a user group that the user belongs to. For example, an organization can assign a unique identity or identifier ("ID") to its users. When a user enrolls a user device with the organization, the user ID of the user enrolling the user device can be associated with the user device. In one example, the user ID can indicate a group within the organization with which the user is associated. The user ID and group can allow the organization to determine rules and access rights that should apply to the user device. In one example, some groups can identify a physical location, or specific areas of a physical location, where an employee works and may need access to. The organization can create surveys according to location and access levels of users. The server can use the user IDs and group IDs to retrieve the appropriate survey to send to the user device. In one example, the server can identify all users that belong to a particular user group and send a survey to user devices of all users in that group.

In an example, the survey sent to the user device can be based on which location the user will attend that day. In one example, the location can be determined based on a group for that location that the user's ID is assigned to. As an example, at the beginning of the day an application on the user device can prompt the user regarding which office they will be attending that day. Different offices can have different security requirements and different surveys with respect to different users. In another example, an application on the user device can recognize which location the user is currently driving too. The user device can communicate this information to a server, which can respond by sending a survey for the user to fill out once their vehicle has come to a stop. The survey can be tailored to the location and type of user. For example, the user may receive a more elaborate survey if they are not attending their usual office location. Likewise, if the user has recently been out of the office, they may receive a different survey. If the user is an executive, they may receive a different survey than cleaning staff, and so on. The admin server can store user profiles that track where the user typically works, security clearance levels, enterprise group, and other information utilized to select the appropriate survey per user.

In still another example, beacons can be physically located next to different building entrances. For example, a BLUETOOTH beacon can be detected by the user device, causing a management application on the user device to download a survey that corresponds to the detected beacon if the user has not already filled out the required survey. A management server can determine whether the user still needs to fill out the survey prior to sending notification of the survey to the user device.

In an example, the notification service can send the survey as a notification to multiple devices associated with a user. For example, a UEM system can require that users enroll a user device before the user device can be used with the enterprise system. Among other things, enrolling a user device with the UEM system can include installing a management application on the user device. The management application can configure and enforce compliance and security settings at the user device. If a user device is not compliant, the management application can execute predetermined protocols, such as by denying access to the enterprise network or wiping enterprise data. Enrolling a user device with the UEM system can associate the user device with a profile for the user. In an example, the notification service can send the survey notification to all user devices enrolled under the user's profile.

At stage 120, the server can receive survey answers from the user device. In an example, once the user completes the survey, the user device can send the survey answers to the server. In one example, the survey answers can be sent from a management application on the user device. In another example, the answers can be sent to a passport service on the server. The server with the passport service can be the same or different from the server that includes the notification service. The passport service can be a service that manages access rights for users and is described in more detail below.

In another example, receiving the survey answers can occur serially as the user answers the questions. This can allow for structuring the survey in such a way that additional answers may only be required based on the user's answers to an initial set of questions. This can help reduce the time it takes for the user to be authorized for access based on their answers, in an example.

At stage 130, the server can determine physical access permissions based on the survey answers. In an example, this stage can be performed by a passport service on the server. In one example, the passport service can analyze survey answers and, based on a set of rules provided by the admin console, determine whether to grant or deny the user physical access rights at a location.

As an example, a COVID-19 survey can ask a user if he or she has experienced fever, chills, or shortness of breath, or has been exposed to someone who tested positive for COVID-19 in the past two weeks. If the user answers yes to any such questions, the passport service can disable physical access for the user to his or her office location. In one example, the passport service can disable access for all users until it receives survey answers from the user and the survey answers indicate access should be allowed. In another example, the survey answers can be set to expire after a predetermined amount of time. Continuing the COVID-19 example, the passport service can be configured to disable access for users every day so that the users are required to answer COVID-19 questions each day before going to work.

At stage 140, the server can send instructions to a PACS to update physical access rights for the user. This can be done, for example, using a database query or an application programming interface ("API") call to the PACS. The instructions can be sent as a data file, in an example. The data file can be an XML, or JSON file, for example. The PACS can be system that manages entry and exit to a location, such as a property, building, or room. This can include managing who can access what location and when. In one example, the PACS can be from a third-party vendor. In an example, the PACS can be part of an electronic access control system that manages entry using human interface devices ("HIDs") at managed locations. In one example, the HID can be an electronic reader that receives a credential from an object that represents the user. Some examples of such an object can include a radio-frequency identification ("RFID") card or key fob, biometric data, such as fingerprint, facial recognition, iris recognition, retinal scan, voice, and hand geometry, and a user device.

In an example where the credential comes from the user device, the HID can connect to the user device using a wireless communication protocol, such as Near-Field Communication ("NFC"), Bluetooth Low Energy ("BLE"), or ultra-wide band ("UWB"). In one example, the user device can provide a credential to the HID that identifies the user. In another example, the user device can provide a digital key assigned to the user device. In still another example, the user device can also provide a certificate, such as a hash or public key-based credential, that verifies the user device. The HID can check the user ID or digital key with the PACS to determine whether the user can enter the location.

FIG. 2 is another flowchart of an example method for analyzing and attesting physical access. At stage 210, a survey can be created at an admin console. For example, an admin user can create a survey using an interface in an admin console. In one example, survey can be part of an interactive notification. For example, the admin can create a notification that instructs users to take a survey before being allowed physical access to a location. The notification can include a button that, when selected by a user, pulls up the survey questions on the user's device.

At stage 220, a management server can send the survey to a user device. In one example, the management server can be a notification server that handles sending notifications to user devices. In another example, the questions in the survey and who the survey is sent to can depend on settings or rules selected by the admin at the admin console. For example, users in an organization can have user profiles that include a user ID. User IDs can be associated with various group IDs, which can group users together based on similar characteristics, such as users of the department, office location, or security level. In an example, the admin can select one or more group IDs for a survey to be sent to. In one example, the survey can be sent to all user devices associated with the user IDs of the selected group IDs.

As an example, rules and regulations regarding gatherings limits during the COVID-19 pandemic vary by country, state, and even county. Many enterprises have offices and other locations in different states and countries. The local ordinances for an employee going to work in one state can be different for an employee going to work in another. For that reason, an admin can tailor the survey questions based on the employee's office location. In one example, admin console can include an option to select a location for a survey. Each location can map to a group ID, and the user ID for each employee can also map to the group ID of his or her office. When the admin finishes configuring the survey, the admin console can send the survey to the management server along with the group ID for the selected location. The management server can identify the user IDs associated with the group ID and send the survey to the corresponding user devices.

In an example, the user device can include a management application. The management application can include a feature that allows a user to indicate when he or she is planning to access a particular location. For example, an employee traveling to a different office from his primary location can load the management application and indicate the office he plans to access. In response the management server can provide a survey specific to the indicated location. The user can be granted access to that location by the passport service if the user completes the survey and the answers indicate that he should be allowed access.

At stage 230, the management server can receive survey answers from the user device. For example, the user can answer the survey questions on the user device. Upon completing the survey, the user device can send the answers to the management server. Based on the answers to those questions, additional survey questions can be sent or withheld, in an example.

In one example, the survey answers can be sent from a management application on the user device. In another example, the answers can be sent to a passport service on the server. The server with the passport service can be the same or different from the server that includes the notification service. The passport service can be a service that manages access rights for users.

At stage 240, the management server can determine physical access rights for the user based on the survey answers. In one example, this stage can be performed by a passport service on the server. In another example, the passport service can analyze survey answers and, based on a set of rules provided by the admin console, determine whether to grant or deny the user physical access rights at a location.

In one example, the survey is part of an overall risk score that is calculated for the user. In addition to the survey, the risk score can account for device compliance for devices associated with the user. For example, a management agent on the user's phone can report that the phone is jailbroken and unencrypted. Based on this device being noncompliant with requirements for the UEM system, the management server can assign a low compliance score to the user. The compliance score can be combined with a survey score to create a risk score. In one example, the admin can determine how much to weigh the survey answers relative to the compliance score in determining the overall risk score. Once determined, the risk score can be compared to an overall threshold required for the physical entrance. Different entrances can have different risk score thresholds. Therefore, the user may be able to enter the office building but not a server room based on their risk score.

At stage 250, the management server can send physical access rights for the user to a PACS. The PACS can manage entry and exit to a location. For example, the PACS can store access rights permissions for users in an organization. In one example, the PACS can be accessible by local access control systems implemented at access points for organization locations. In one example, the local access control system can include an HID that retrieves credentials from a user and a barrier that prevents physical access without approval. As some examples, the physical barrier can be a door with a lock, a turnstile, a parking gate, or an elevator. When a user attempts to access a location, the local access control system can retrieve a digital key or other ID from the user and check it with the PACS to determine whether the user is authorized to access the location.

The access rights sent to the PACS can depend on whether the user's risk score exceeds the threshold for that location. If so, then access rights can be granted. The access rights can also require additional verification at the location, such as facial identification using image recognition. Other second factor authentication may also be required, and the requirement can depend on the risk score, in an example.

As an example, at stage 260, the user device can interact with an HID to request access to a location. For example, the HID can connect to the user device using a wireless communication protocol, such as NFC, BLE, or UWB. The user device can provide a digital key or other identifier to the HID. In one example, the digital key can be stored and managed by a management application. In another example, the user device can also provide a certificate that verifies the user device or stand in front of a camera for facial recognition.

At stage 270, the HID can check for physical access rights for the user with the PACS. For example, the HID can communicate with the PACS, either directly or through an additional device like a local server. The HID can send the digital key and any other ID or credential to the PACS. The PACS can check the digital key against physical access permissions for the user and respond to the HID with whether the user can access the location. The HID can then open the barrier or keep it locked depending on the physical access permissions.

In one example where access is denied, the PACS can notify the management server. The management server can send a notification to the user device indicating why entry was denied. In an example where the user has not completed a survey, the management server can send the survey in the notification and indicate that the user must first complete the survey before gaining access. The user can then complete the survey and attempt to access the location again. In another example, the survey can be set to expire after a predetermined amount of time. In an example where a user's survey has expired, the management server can send a notification to the user device indicating such. In one example, the notification can include a new survey for the user to complete.

Continuing the COVID-19 example, an admin can create a COVID-19 survey notification at an admin console. The survey notification can ask users to verify that they have not been in contact with someone with COVID-19 symptoms or tested positive for COVID-19. The admin console can send the survey notification to a notification service. The notification service can send the notification to user devices according to configuration settings provided at the admin console. When a user completes the survey, the user's device can send the answers to the passport service. The passport service can assess the user's response to determine whether to enable or disable physical access for the user. The passport service can then send the physical access permissions to the PACS. When the user attempts to gain entry to the location, the user's device can interact with an HID at the location and provide information identifying the user and verifying the user device, such as a digital access badge and a credential. The HID can query the PACS for the user's access permissions and send the user ID information. The PACS can authenticate the user device with the credential and check the user's access permissions. The PACS can then respond to the HID with the access permissions, and the HID can grant or deny the user access based on the PACS response.

In an example, of the above described method, the management server can send access permissions to the user device. This can be done in lieu of, or in conjunction with, the management server sending the physical access permission to the PACS at stage 250. In one example, the management server can provide the physical access permissions to the management application on the user device. The management application can store a digital access badge associated with the user's ID. Upon receiving the physical access permissions from the management server, the management application can update the digital access badge accordingly. When the user attempts to access a location, the user device can provide the digital access badge, which can include the user ID and the physical access permissions. The HID can grant or deny access based on the physical access permissions provided by the user device.

In another example of the above described method, physical access permissions can vary depending on the survey response. For example, instead of a simple grant or denial of complete access, the user can be granted limited access based on the survey response. As an example, a survey can include questions that correspond to different levels or areas of access of a facility. Although the user's survey response can indicate that the user should be allowed to enter the facility, the response can also indicate that the user should de denied access to certain areas of the facility. Using the COVID-19 survey as an example, a user can be allowed access to a facility if the response indicates that he or she has not experienced any COVID-19 symptoms, the user can be denied access to certain areas of the facility if the response indicates that the user may have come in contact with someone who contracted COVID-19.

FIG. 3 is a sequence diagram of an example method for analyzing and attesting physical access. At stage 302, an administrator can create a survey using the admin console. For example, an admin user can create a survey using an interface in an admin console. In one example, the survey can be part of an interactive notification. For example, the admin can create a notification that instructs users to take a survey before being allowed physical access to a location.

The notification can include a button that, when selected by a user, pulls up the survey questions on the user's device.

At stage 304, the administrator console can send the survey to a notification server. As an example, the admin console can be configured to send the notification to the notification server once the admin user finishes creating the survey. For example, the interface can include a button that the admin can select to indicate that the notification should be sent to the user device prior to the user entering a location. In one example, the admin console can also specify delivery information for the notification. As some examples, delivery information can include which user devices or groups of user devices to send the notification to, whether and when the survey in the notification expires, how long before a user must retake a survey, and criteria when the notification should be sent. The notification can be sent based on a start time or based on a determination that the user is travelling to a particular office, in an example. In one example, the notification simply prompts the user to indicate where they will be attending work today, and separate survey questions can follow based on that answer.

At stage 306, the notification server can send the notification to the user device. In an example, the notification server can send the notification to a management application on the user device. In another example, the notification server can send the notification to a third-party push notification service that then pushes the notification to the user device.

At stage 308, a user can complete the survey on the user device. As an example, the notification can be an interactive notification that includes a button that the user can select to take the survey. The survey can be determined based on which office the user will attend, in an example, which can be stored in the management server as part of a user profile or selected on the user device by the user. Selecting the button to take the survey can cause the survey questions to appear in an interface on the user device. In one example, the button can include a link, such as with a uniform resource locator ("URL"), that directs to a web site with the survey. Selecting the button can cause the user device to access the link and load the web page in a browser on the user device. In another example, the notification can be configured to load the survey questions within the notification itself. At stage 310, the user device can send the survey answers to a passport service.

At stage 312, the passport service can determine physical access rights for the user based on the survey answers. For example, when the admin creates the survey, the admin can also indicate how the survey questions must be answered for a user to be allowed physical access to a location. As an example, a COVID-19 survey can ask a user if he or she has experienced fever, chills, or shortness of breath, or has been exposed to someone who tested positive for COVID-19 in the past two weeks. If the user answers yes to any such questions, the passport service can disable physical access for the user. If the user answers no to all the questions, the passport service can enable physical access. Alternatively, the answers can result in a positive survey score being combined with other factors, such as device compliance, to yield the total risk score. The risk score can then be compared to a threshold to enable physical access.

At stage 314, the passport service can send a physical access notification for the user to the notification service. For example, the passport service can send a notification to the notification server that indicates whether the user can access the location based on the survey answers. At stage 316, the notification service can send the physical access notification to the user device. This can inform the user whether he or she can access the location, which can prevent the user from traveling to the location if he knows he cannot enter. In one example, where the user is denied physical access, the notification can include a link or button for taking the survey again.

At stage 318, the passport service can send the physical access rights for the user to a PACS. The PACS can be server or system that manages entry and exit to a location, such as a property, building, or room. As an example, the PACS can store the physical access rights status for each employee in an enterprise. The PACS can update the status according to instructions from the passport service. In an example, the PACS can be part of an electronic access control system that manages entry using HIDs at managed locations.

Stages 318 and the combination of stages 314 and 316 can occur simultaneously, in an overlapping fashion, or in a different order. For example, the passport service can send the physical access rights to the PACS before it sends the physical access rights to the notification server. In another example, the passport service can send the physical access rights to the PACS and the notification service simultaneously.

At stage 320, the user device can present an access badge to an HID. The access badge can be a digital access badge, in an example. For example, the digital access badge can include a credential and user ID that can be used to verify the user and determine whether the user has access rights to the location. In some examples, the digital access badge can include a passcode or an RFID card. In one example, the digital access badge can be stored on the user device. When the user approaches the HID, the HID can connect to the user device using a wireless communication protocol, such as NFC, BLE, or UWB. In one example, the user device can include a management application that is responsible for managing the digital access key. In one example, the management application can run in the background of the user device, and when the HID connects to the user device, the management application can handle delivering the digital access key to the HID.

At stage 322, the HID can query the PACS about whether the user is authorized to enter the location. This can be done, for example, using a database query or an API call to the PACS. In an example, the query can include the digital access badge of the employee. In another example, the query can include a user ID for the user. At stage 324, the PACS can respond to the HID's query. In an example, the PACS can send a data file, such as an XML, or JSON file, indicating whether the user can access the location or not.

At stage 326, the HID can grant or deny access for the user based on the PACS response. As an example, the HID can control a barrier that prevents physical access without approval. As some examples, the physical barrier can be a door with a lock, a turnstile, a parking gate, or an elevator. If an employee is allowed access to the location, the HID can unlock or remove the barrier.

In some examples, when the user attempts to access the location with the user device, the user device can prompt the user for more information if needed. For example, if a user has not yet completed the survey, the user device can alert the user, such as with a tone or vibration, and display a notification that the survey needs to be completed. In another example, the HID can send instructions to the user device to prompt the user for additional information. For example, during the COVID-19 pandemic, some local authorities or employers may require that employees wear facemasks while inside a location. When a user attempts to enter the location, the user device can alert the user and display a notification that asks the employee if he or she is wearing a mask. The user can interact with the notification to indicate that he or she is wearing a mask, such as by selecting a button in the notification that indicates confirmation. The user device can notify the HID, or in some examples the passport service, and the HID can be instructed to grant the user access to the location.

FIGS. 4A and 4B are illustrations of an example graphical user interface ("GUI") of an admin console used to create a notification with a survey for assessing physical access rights. FIG. 4A illustrates a "Content" page 400 that allows an admin user to provide the content of a survey notification. The Content page 400 can include a preview window 401. The preview window 401 can display how the survey notification will appear on user devices. In one example, the preview window 401 can update in real time as the admin makes changes to the survey notification. In one example, the preview window 401 can be a static window that shows an example survey notification and indicates where each field will be displayed. The Content page 400 can include a "Title" field 402 that allows an admin to name the survey notification and a "Description" field 404 that allows the admin to provide a description of the survey notification. The Title and Description can provide information to users who will fill out the survey. Using COVID-19 as an example, the admin name the survey notification "Return to Work Survey" in the Title field 402 and enter a description in the Description field 404 that reads "All employees must complete this survey regarding COVID-19 before accessing any company offices."

In an example, the Content page 400 can include a "Location" field 406 that allows the admin to enter, or in some examples to select, a location. In one example, information entered into the Location field 406 can be displayed to the admin or user so that they can know for which location the survey applies. In another example, the Location field 406 can allow an admin to select one or multiple locations of an enterprise. In one example, the survey can then be used to allow a user access to all the selected locations. For example, COVID-19 regulations can vary greatly from one place to another. The Location field 406 can allow the admin to create a survey that applies to a set of locations that share similar COVID-19 regulations.

In an example, the Content page 400 can include a "Time Zone" field 408. The Time Zone field 408 can be used to determine the validity and expiration of the survey. The GUI 400 can also include a "Validity Period" field 410. The Validity Period field 410 can determine how long the survey results are good for. For example, for COVID-19 an enterprise can require that employees complete the survey every day before going to work. The PACS can be configured to reset the physical access rights for employees to disabled after the survey answers expire. In one example, the validity period can begin after the survey is completed. In another example, the validity period can depend on the time zone selected in the "Time Zone" field 408. For example, the admin can configure all survey answers to expire at the same time regardless of when the survey was completed. As some examples, the survey answers can be set to expire at 12:00 am Eastern Standard Time ("EST") every night or 1:00 AM every Saturday.

In an example, the Content page 400 can include a "Survey" field 412. The survey field can include an area where the admin can enter the survey questions. In one example, the Survey field 412 can be configured to recognize questions in a certain format. For example, the "Survey" field 412 can instruct the admin to enter each survey question on its own line and as a yes or no question. In one example, a yes or no selection box can be attached to each question when the survey notification is sent to user devices. In another example, the admin can phrase the questions so that they all require the same answer for a user to be given physical access. The survey notification presented on the user device can display all the questions and provide buttons for a user to answer all the questions with a yes or a no. This is described in more detail below regarding FIG. 5B.

FIG. 4B illustrates an example "Scheduling" page 420 of the GUI that can allow the admin to schedule the survey notification. In an example, the Scheduling page 420 can include a "Expiration Date" field 422 that allows the admin to choose a date when the survey will expire. In one example, the Expiration Date field can include a selectable calendar 424 that allows the admin to select a date. The Scheduling page 420 can also include a time field 426 and a time zone field 428. These fields can be used to select the time of day, and in which time zone, the survey notification will expire. In an example, the survey notification can reset according to the validity period until the expiration time is reached.

Figure 5A:
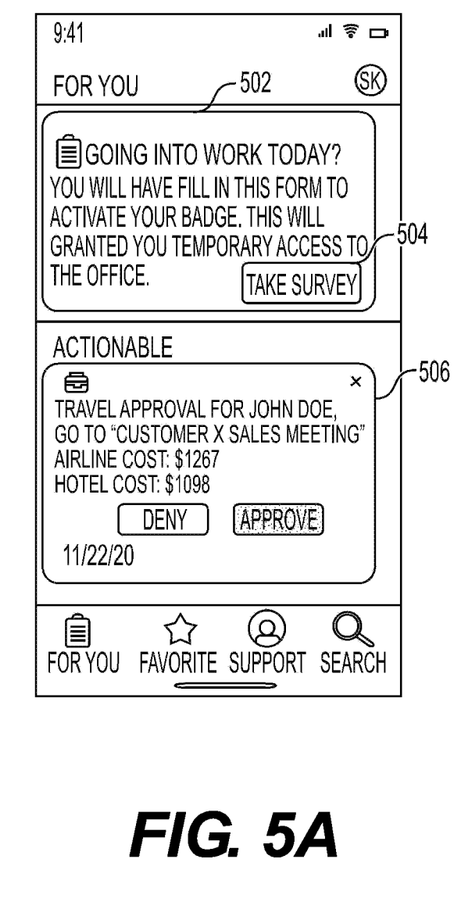
FIGS. 5A, 5B, 5C, and 5D are illustrations of a second example GUI for analyzing and attesting physical access.

FIGS. 5A, 5B, 5C, and 5D are illustrations of an example GUI for a survey notification on a user device. FIG. 5A illustrates an example survey notification 502 that can be displayed on the user device. The survey notification 502 can be displayed in a notification window, in an example. In one example, the survey notification 502 can be a priority notification, and the user device can display it above other non-priority notifications, like notification 506. In an example, the survey notification can include a survey button 504.

Figure 5B:
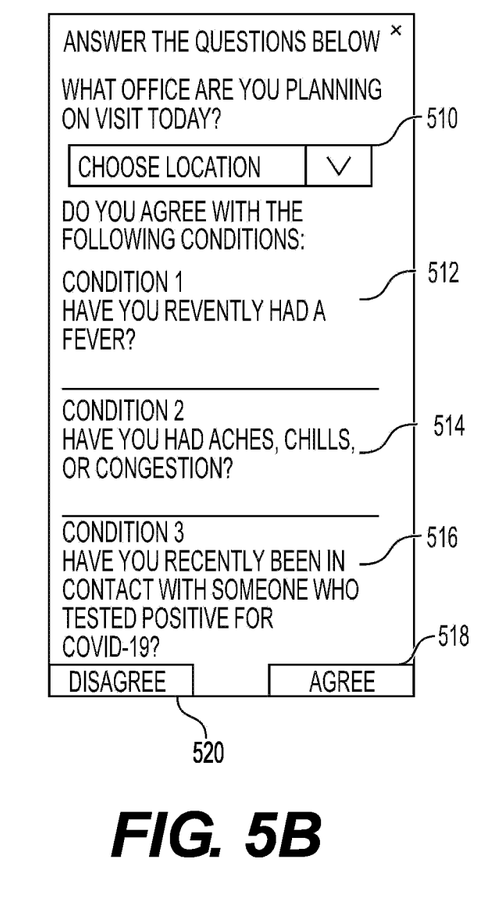
Figure 6:
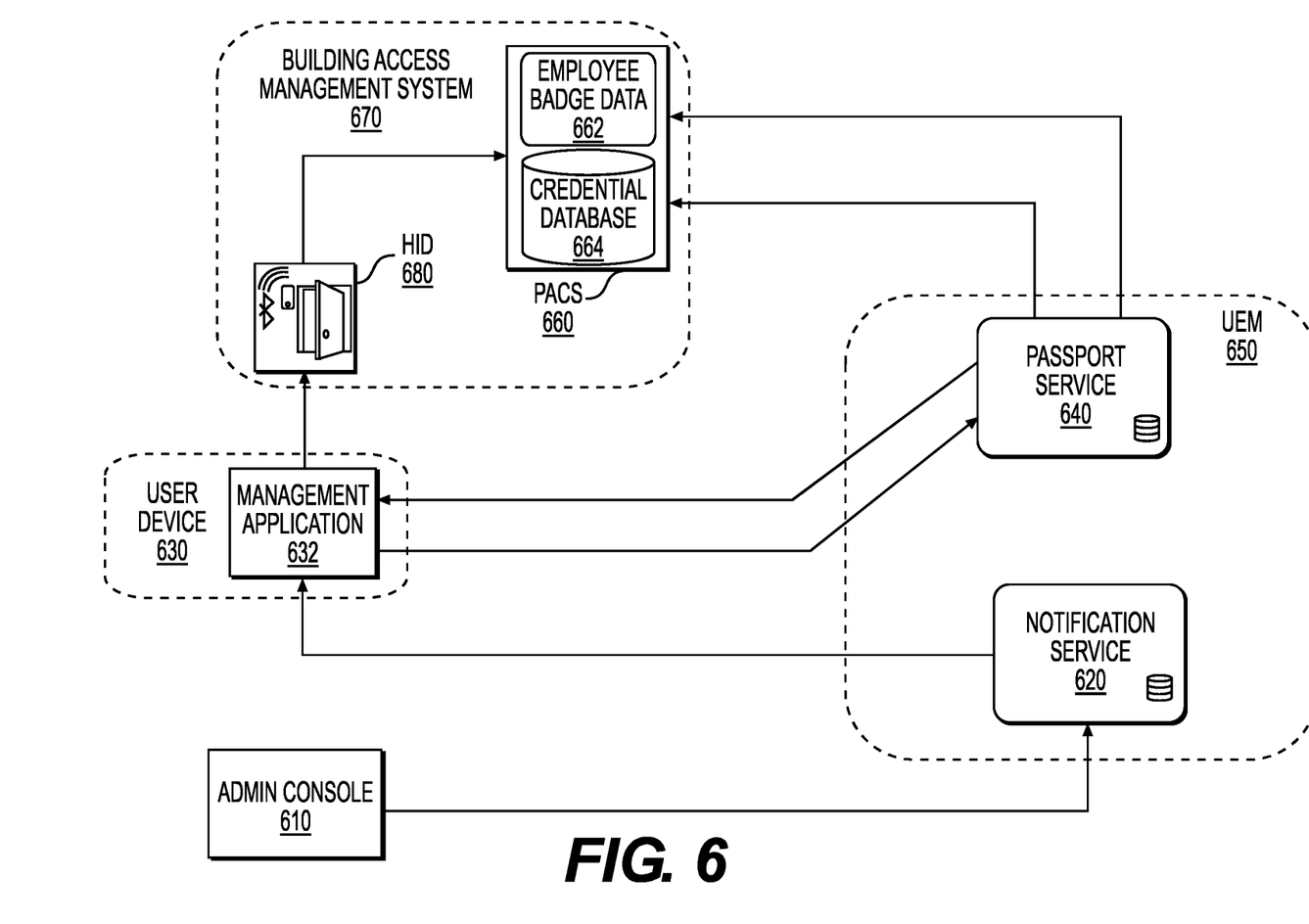
FIG. 6 is an illustration of an example system for analyzing and attesting physical access.

Selecting the survey button can cause the user device to display survey content shown in FIG. 5B. For example, the survey content can include a "Choose Location" field 510 where an employee can choose a location that he or she plans to visit. In an example where the employee is only allowed access to a single location, the survey content can instead display the location that the survey is for. The survey content can also include survey questions 512, 514, and 516, which can correspond to survey questions provided in Survey field 412 from FIG. 4A. The survey content can also include an "Agree" button 518 and a "Disagree" button 520. The Agree button 518 and Disagree button 520 can indicate whether the user agrees with the survey questions. In one example, each of survey questions 512, 514, and 516 can include its own Agree button 518 and Disagree button 520.

Figure 5C:
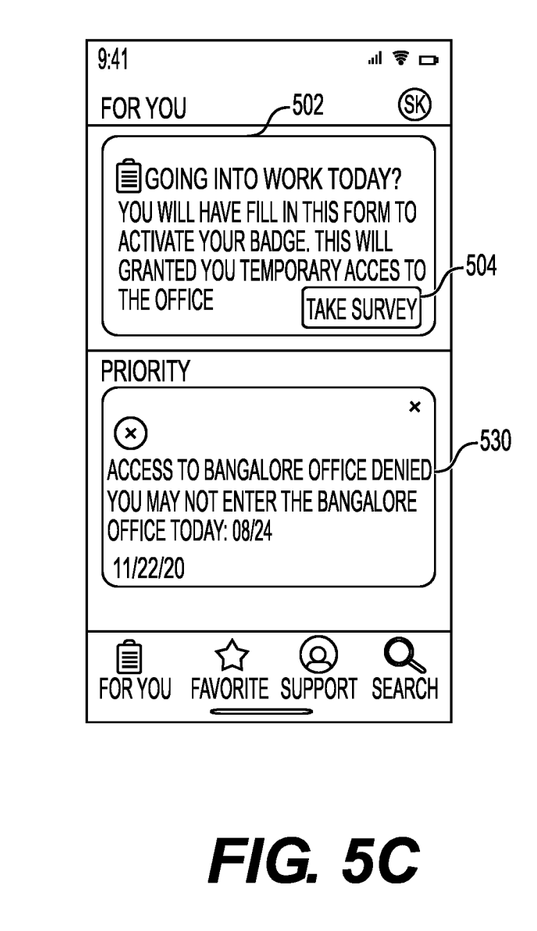

FIG. 5C illustrates an example window that can be displayed if the employee selects the Disagree button 520 or is not granted access based on their survey answers. An access denied window 530 can be displayed to the employee informing the employee that he or she cannot enter the location selected at Choose Location field 510. In an example, the survey notification 502 can again be displayed in the notification window, along with the survey button 504. This can allow the employee to retake the survey in case the employee pushed the wrong button or if the employee's answers change. In one example, the access denied window can be displayed as part of the survey notification 502. In an alternative example, the access denied window 530 can be a new notification.

Figure 5D:
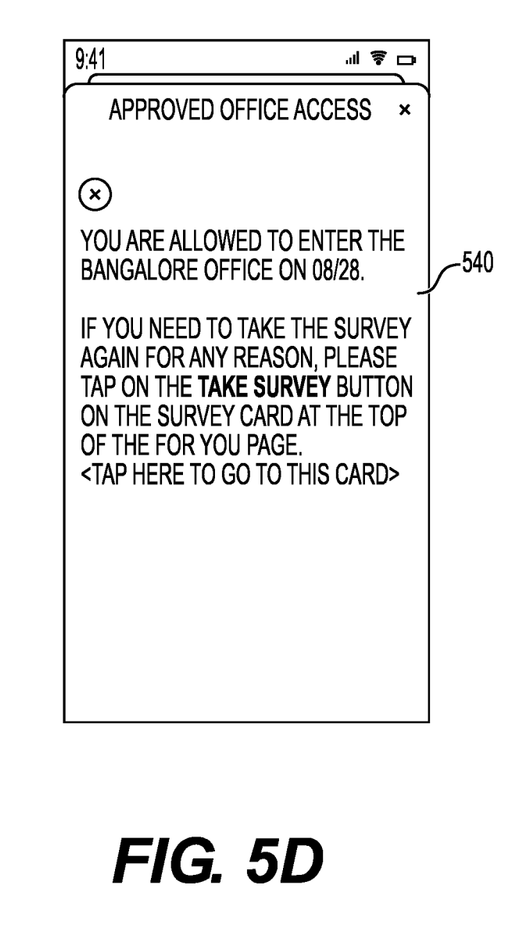

FIG. 5D illustrates an example window that can be displayed if the employee selects the Agree button 518 and is granted access based on their survey answers. In an example, the window can include an access approved window 540. The access approved window 540 can inform the user which office(s) he or she can enter and for when access is allowed. In one example, the access approved window can be displayed as part of the survey notification 502. In an alternative example, the access approved window 540 can be a new notification.

FIG. 6 is an illustration of a system for analyzing and attesting physical access. The system can include an admin console 610. In an example, the admin console 610 can be an interface that allows an administrator to manage user accounts and configuration settings for an organization, such as UEM system 650. The interface can be accessible using an admin account. For example, an admin can log into a computing device or application to access the interface. In an example, the interface can include a tool for creating a survey. In one example, the survey can be created as a notification that can be sent out to user devices.

When a survey notification is created, the admin console can send it to a notification service 620. In an example, the notification service 620 can be a service installed on a server in the UEM system 650. The server can be a single server or a group of servers, including multiple servers implemented virtually across multiple computing platforms. The UEM system 650 can be a system that manages and secures user devices, like user device 630, that are enrolled with an enterprise. The user device 630 can be one or more processor-based devices, such as a personal computer, tablet, or cell phone. In an example, the user device 630 can include a management application 632. The management application 632 can communicate with a management server in the UEM system 650 to configure and enforce compliance and security settings at the user device 630.

In an example, the notification service 620 can manage notifications for the UEM system 650. For example, the notification service 620 can send notifications from various UEM applications and services to user devices. In an example, the notification service 620 can send survey notifications to the user device 630 according to settings configured at the admin console 610. For example, the admin console 610 can allow an admin to choose which users receive a survey notification, when to send the survey notification, and when the survey notification expires. The notification service 620 can send the survey notification when and as frequently as configured by the admin console 610.

In one example, the management application 632 can manage the survey notification at the user device 630. For example, the management application can receive the survey notification and cause it to be displayed on the user device 630. After a user completes the survey, the management application 632 can send the survey answers to a passport service 640.

The passport service 640 can be a service that manages access rights for users and is described in more detail below. In an example, the passport service 640 can be installed on a server in the UEM system 650. In one example, the passport service 640 can adjust physical access rights for users according to survey answers. For example, the passport service 640 can enable or disable physical access rights for a user depending on the user's survey answers. In one example, the passport service 640 can disable physical access rights for a user when the user does not answer the survey. For example, when a new notification survey is sent to the user device 630, the passport service 640 can disable physical access rights for the user until the user completes the survey.

In an example, when the passport service 640 enables or disables physical access rights for a user, the passport service 640 can notify a PACS 660. The PACS 660 can be system that manages entry and exit to a location, such as a property, building, or room. For example, the PACS 660 can include employee badge data 662 and a credential database 664. The employee badge data 662 can be data that indicates physical access rights for a user. For example, the employee badge data 662 can include the user's ID and which locations the user is allowed to access. The credential database 664 can include credential information for the user. For example, the credential information can include credential information for authenticating the user device 630 when the user attempts to access a location.

As an example, when the user attempts to access a physical location, the user device 630 can interact with a HID 680 at the location. The PACS 660 and HID 680 can make up a building access management system 670 that locally manages physical access. The HID 680 can be an interface device that controls a barrier used to prevent unauthorized physical access to a location. The HID 680 can be configured to receive a user's digital access badge. As some examples, a user can enter an ID on a keypad, touch a sensor with an RFID card or key fob, or the HID can connect to the user device 630 using a wireless communication protocol like NFC, BLE, or UWB. Where the HID 680 communicates with the user device 630, the management application 632 can handle a credential exchange with the HID 680. For example, the management application 632 can provide a digital access badge and credentials that authenticate the user device 630. The HID 680 can query the PACS 660 to determine whether the user is permitted to access the location. If so, the HID 680 can remove or unlock the barrier.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for analyzing and attesting physical access, comprising:
   identifying a user group based at least in part on a user identity associated with a user device;
   identifying a survey associated with the user group;
   causing a first notification to be sent to the user device, the first notification comprising the survey;
   identifying a second notification sent by the user device, the second notification comprising a first response to the survey;
   in response to the second notification, sending a digital key to the user device;
   determining, based on the first response to the survey, physical access permissions for the user identity at a location; and
   sending the physical access permissions to a physical access control system, wherein the digital key is compared to the physical access permissions by the physical access control system to determine whether to grant physical access to the location.

2. The method of claim 1, further comprising causing the physical access permissions for the user identity to be sent to the user device.

3. The method of claim 2, wherein, in an instance where a user attempts to access the location, the user device provides the user identity and the physical access permissions to a physical access control system that controls physical access to the location.

4. The method of claim 1, wherein, based on the first response to the survey, a user is granted access to a first plurality of areas of the location and denied access to a second plurality of areas of the location.

5. The method of claim 1, wherein the survey expires after a predetermined amount of time, and the method further comprises:
sending instructions to the physical access control system to disable physical access permission for the user after the survey expires; and
in response to the first response expiring, causing the first notification to be resent to the user device.

6. The method of claim 1, further comprising causing a third notification to be sent to the user device that indicates whether physical access is granted or denied, wherein the grant or denial is based on a risk score that incorporates the first response.

7. A non-transitory, computer-readable medium containing instructions that, when executed by a hardware-based processor, performs stages for analyzing and attesting physical access, the stages comprising:
identifying a user group based at least in part on a user identity associated with a user device;
identifying a survey associated with the user group;
causing a first notification to be displayed at the user device, the first notification including an explanation that the user must take action to be allowed physical access to a location and an action element that, when selected, displays the survey;
identifying a second notification sent by the user device, the second notification comprising a first response to the survey;
in response to the second notification, sending a digital key to the user device;
determining, based on the first response to the survey, physical access permissions for the user identity at a location; and
sending the physical access permissions to a physical access control system, wherein the digital key is compared to the physical access permissions by the physical access control system to determine whether to grant physical access to the location.

8. The non-transitory, computer-readable medium of claim 7, further comprising causing the physical access permissions for the user identity to be sent to the user device.

9. The non-transitory, computer-readable medium of claim 8, wherein, in an instance where a user attempts to access the location, the user device provides the user identity and the physical access permissions to a physical access control system that controls physical access to the location.

10. The non-transitory, computer-readable medium of claim 7, wherein, based on the first response to the survey, a user is granted access to a first plurality of areas of the location and denied access to a second plurality of areas of the location.

11. The non-transitory, computer-readable medium of claim 7, wherein the survey expires after a predetermined amount of time, and the stages further comprise:
sending instructions to the physical access control system to disable physical access permission for the user after the survey expires; and
in response to the first response expiring, causing the first notification to be resent to the user device.

12. The non-transitory, computer-readable medium of claim 7, further comprising sending a notification to the user device that indicates whether physical access is granted or denied, wherein the grant or denial is based on a risk score that incorporates the first response.

13. A system for analyzing and attesting physical access, comprising:
a memory storage including a non-transitory, computer-readable medium comprising instructions; and
a computing device including a hardware-based processor that executes the instructions to carry out stages comprising:
generating a survey based on receiving input at a graphical user interface ("GUI") from an admin user, the input including a selection of at least one location, at least one survey question, and at least one time period;
identifying a user group based at least in part on a user identity associated with a user device requesting access;
identifying the survey based on the survey being associated with the user group;
causing a first notification to be sent to the user device, the first notification comprising the survey;
identifying a second notification sent by the user device, the second notification comprising a first response to the survey;
in response to the second notification, sending a digital key to the user device;
determining, based on the first response to the survey, physical access permissions for the user identity at a location; and
sending the physical access permissions to a physical access control system, wherein the digital key is compared to the physical access permissions by the physical access control system to determine whether to grant physical access to the location.

14. The system of claim 13, the stages further comprising causing the physical access permissions for the user identity to be sent to the user device.

15. The system of claim 14, wherein, in an instance where a user attempts to access the location, the user device provides the user identity and the physical access permissions to a physical access control system that controls physical access to the location.

16. The system of claim 13, wherein, based on the first response to the survey, a user is granted access to a first plurality of areas of the location and denied access to a second plurality of areas of the location.

17. The system of claim 13, wherein the survey expires after a predetermined amount of time, and the stages further comprise:
sending instructions to the physical access control system to disable physical access permission for the user after the survey expires; and
in response to the first response expiring, causing the first notification to be resent to the user device.

* * * * *